(12) United States Patent
Stone et al.

(10) Patent No.: US 6,884,014 B2
(45) Date of Patent: Apr. 26, 2005

(54) TOLERANCE COMPENSATING MOUNTING DEVICE

(75) Inventors: Roger Stone, Brighton (GB); Brian Russell Knight, Shorcham-by-Sea (GB)

(73) Assignee: The Gates Corporation, Denver, CO (US)

( * ) Notice: Subject to any disclaimer, the term of this patent is extended or adjusted under 35 U.S.C. 154(b) by 254 days.

(21) Appl. No.: 10/267,071

(22) Filed: Oct. 7, 2002

(65) Prior Publication Data

US 2003/0077142 A1 Apr. 24, 2003

Related U.S. Application Data

(63) Continuation-in-part of application No. 09/840,265, filed on Apr. 23, 2001, now abandoned.

(51) Int. Cl.[7] ............................ F16B 21/18; F16B 37/12
(52) U.S. Cl. ...................... 411/352; 411/107; 411/178; 411/970; 411/999
(58) Field of Search ............................... 411/107, 352, 411/353, 178, 970, 999

(56) References Cited

U.S. PATENT DOCUMENTS

| 4,078,276 A | | 3/1978 | Nunes ........................... 16/130 |
| 4,159,184 A | | 6/1979 | Burwell ......................... 403/2 |
| 4,165,904 A | * | 8/1979 | Reppert .................... 411/178 X |
| 4,518,276 A | | 5/1985 | Mitchell et al. ............... 403/13 |
| 4,682,906 A | | 7/1987 | Ruckert et al. ........... 403/409.1 |
| 4,846,614 A | | 7/1989 | Steinbock ..................... 411/307 |
| 4,881,316 A | | 11/1989 | Wing ............................ 29/510 |
| 6,179,538 B1 | | 1/2001 | Palm ........................... 411/399 |
| 6,357,953 B1 | | 3/2002 | Ballantyne ..................... 403/43 |

FOREIGN PATENT DOCUMENTS

| CH | 353647 | 4/1961 | |
| DE | 41 10 664 C1 | 6/1992 | ............. F16B/5/02 |
| EP | 0 023 404 A1 | 2/1981 | ........... F16B/37/12 |
| WO | WO 02/10595 | 7/2002 | ............. F16B/5/02 |

* cited by examiner

*Primary Examiner*—Neill Wilson
(74) *Attorney, Agent, or Firm*—J. A. Thurnau, Esq.; C. H. Castleman, Esq.; S. G. Austin, Esq.

(57) ABSTRACT

The invention comprises a tolerance compensating mounting device comprising a bushing having an internal and external thread. The bushing is threaded into a part to be mounted to a surface. A bolt is then threaded into a bushing bore using the internal threads. The internal threads cause an interference fit between the bolt shank and the threads, temporarily preventing further insertion of the bolt. The bolt is then turned further, thereby turning the bushing and causing the bushing to unscrew from the part toward the mounting surface until the bushing seats on the mounting surface, thereby completely compensating for a tolerance gap. As the bolt is turned further, at a relatively low torque the sacrificial internal threads are stripped allowing the bolt to be fully torqued into the mounting surface hole, thereby simultaneously connecting the components with a properly torqued connection while compensating for a tolerance gap.

17 Claims, 5 Drawing Sheets

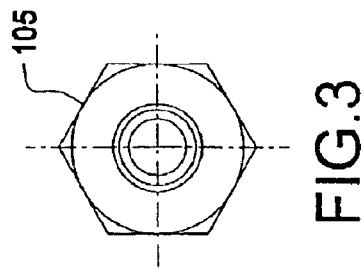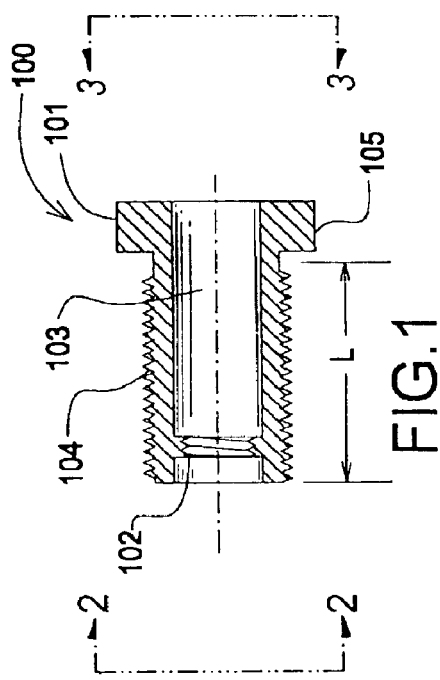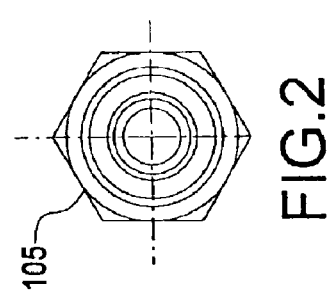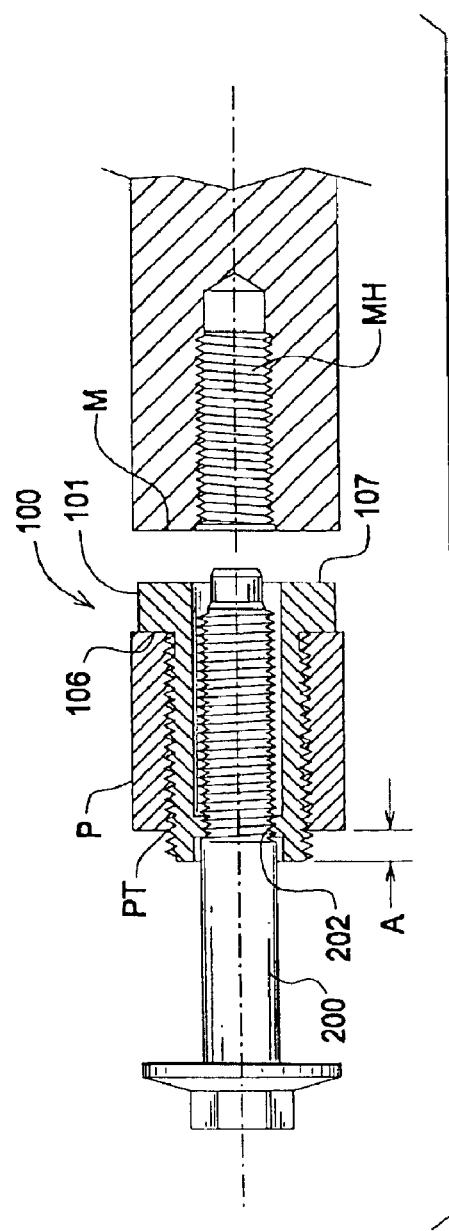

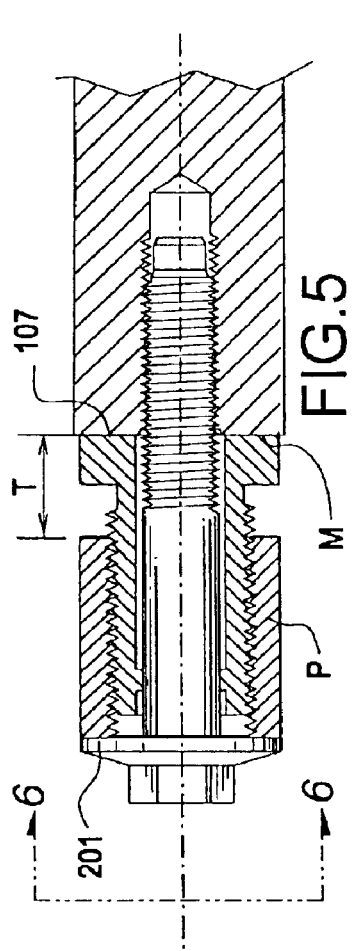
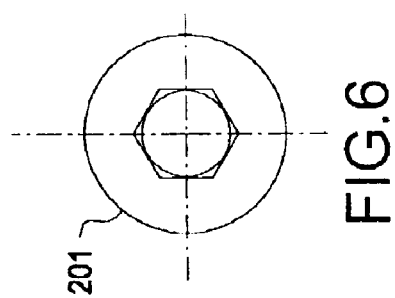
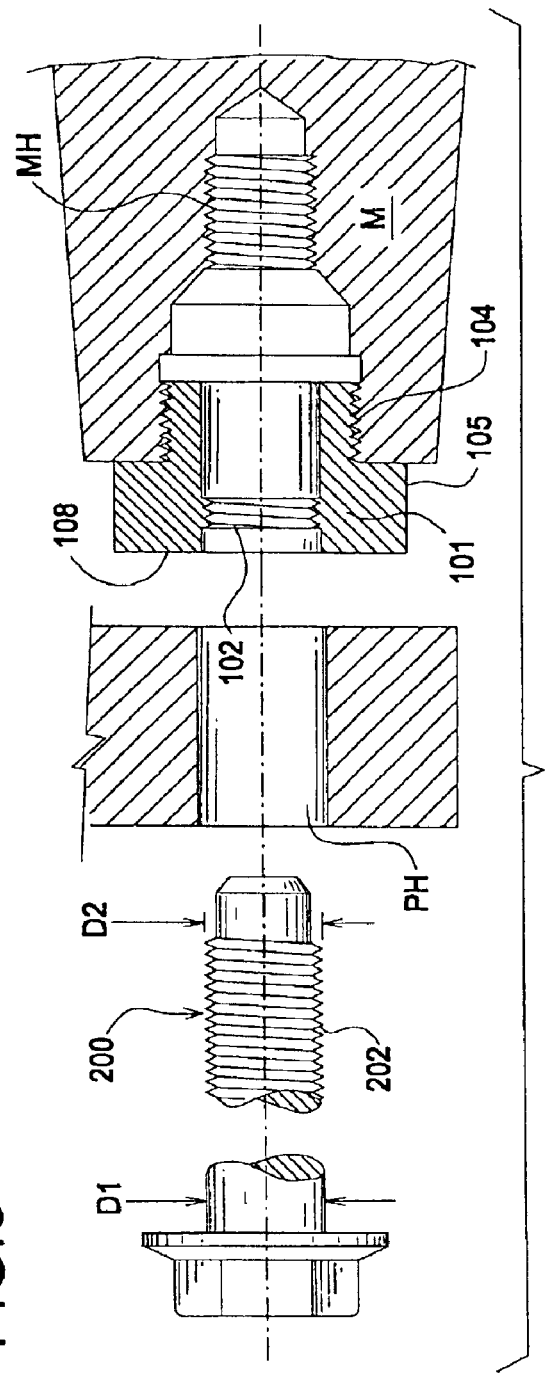

US 6,884,014 B2

TOLERANCE COMPENSATING MOUNTING DEVICE

REFERENCE TO RELATED APPLICATIONS

This application is a continuation-in-part of and claims priority from U.S. application Ser. No. 09/840,265 filed Apr. 23, 2001, now abandoned.

FIELD OF THE INVENTION

The invention relates to a fastening device, and more particularly, to a tolerance compensating mounting device used to connect components while compensating for a fit tolerance between the components.

BACKGROUND OF THE INVENTION

Assembly of equipment components can be adversely affected by tolerances, that is, dimensional differences between components that may result in gaps at fastening points. They cannot always be eliminated, but only allowed for in the assembled device. Tolerances can also "stack" when more than two components are joined at a particular location, creating a significant dimensional deviation or gap.

Tolerances may be very small, fractions of a millimeter, or very large, several millimeters, depending upon the circumstances. Larger tolerances generally reduce manufacturing costs.

Attempts have been made in the prior art to eliminate tolerances or to compensate for them in an assembled device. These generally comprise shims or screw type devices that fill the gap between the mating surfaces of the components to be joined. The shims or screw type devices are generally a separate component from the fasteners.

Representative of the art is U.S. Pat. No. 4,682,906 (1987) to Ruckert et al. which discloses a device for the clamping connection of structural parts which are spaced apart from each other by means of a spacer disk arranged within said space and resting by its outer broad side against one structural part.

Also representative of the prior art is U.S. Pat. No. 5,501,122 to Leicht et al. which discloses a twin cone device for aligning holes in components to be joined. The device comprises a set of conical structures joined by a bolt.

The prior art does not solve the problem of compensating for tolerances between planar mounting surfaces while simultaneously joining the components in a properly torqued or clamped manner; all without inducing undesirable stresses in the components. Nor does the prior art allow a component having non-coplanar connecting surfaces to be properly joined. Nor does the prior art provide a fastener that automatically compensates for a tolerance gap or clearance between mounting surfaces as part of the assembly process.

What is needed is a device that completely spans a clearance or tolerance gap between components to be joined using a threaded bushing while simultaneously connecting the components. What is needed is a device that completely spans a tolerance gap between components to be joined using a threaded fastener. What is needed is a device that automatically compensates for a tolerance gap during installation. The present invention meets these needs.

SUMMARY OF THE INVENTION

The primary aspect of the invention is to provide a tolerance compensating mounting device that completely compensates for a tolerance gap or assembly clearance between components to be joined using a threaded bushing while simultaneously connecting the components.

Another aspect of the invention is to provide a tolerance compensating mounting device that completely compensates for a tolerance gap between components to be joined using a threaded fastener.

Other aspects of the invention will be pointed out or made obvious by the following description of the invention and the accompanying drawings.

The invention comprises a tolerance compensating mounting device comprising a bushing having an internal and external thread. The bushing is threaded into a part to be mounted to a surface. A bolt is then threaded into a bushing bore using the internal threads. The internal threads cause an interference fit between the bolt shank and the threads, temporarily preventing further insertion of the bolt. The bolt is then turned, thereby turning the bushing and causing the bushing to unscrew from the part toward the mounting surface until the bushing bears upon the mounting surface, thereby completely compensating for a tolerance gap. As the bolt is turned further, the sacrificial internal threads are stripped to allow the bolt to be fully torqued into the mounting surface hole, thereby simultaneously connecting the components while compensating for a tolerance gap.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 is a cross-section view of the tolerance compensating device.

FIG. 2 is a plan view at line 2—2 in FIG. 1.

FIG. 3 is a plan view at line 3—3 in FIG. 1.

FIG. 4 is a side cross-section view of the inventive device.

FIG. 5 is a side cross-section view of the inventive device.

FIG. 6 is a plan view at line 6—6 in FIG. 5.

FIG. 7 is a cross-section view of an alternate embodiment.

DETAILED DESCRIPTION OF THE PREFERRED EMBODIMENT

Figure 8:
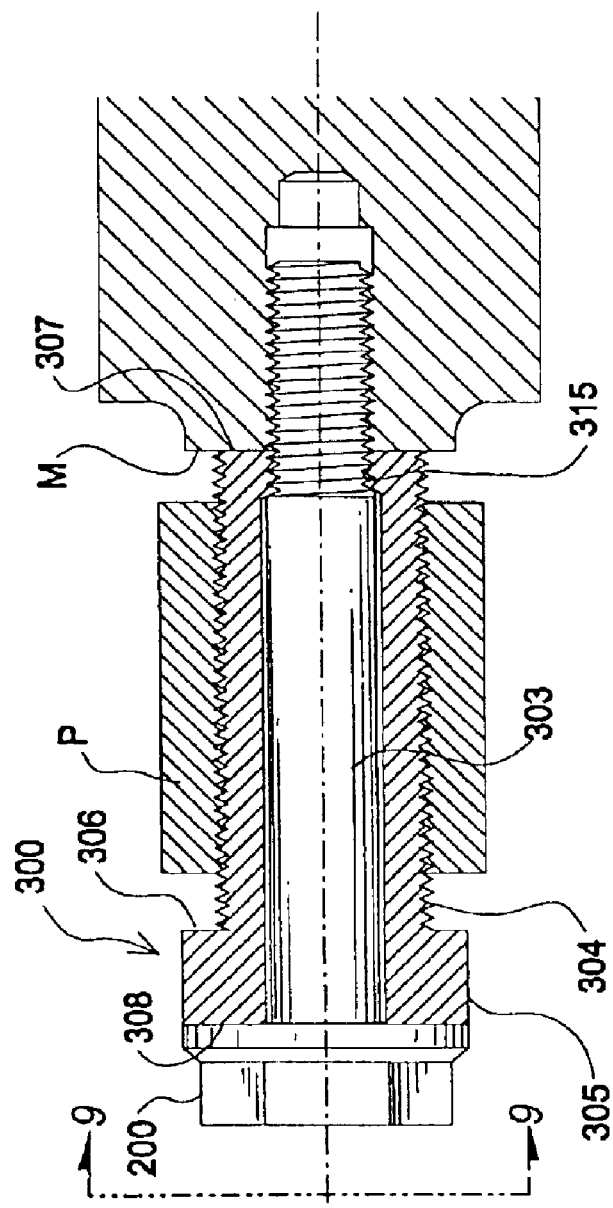
FIG. 8 depicts a third alternate embodiment of the invention.

FIG. 1 is a cross-section view of the tolerance compensating mounting device. The inventive device 100 comprises bushing 101. Bushing 101 is substantially cylindrical. Bushing 101 having a surface feature 102 comprising a thread. Surface feature 102 may comprise raised potions of the surface for engaging a fastener as described herein. In the preferred embodiment surface feature comprises thread 102.

Thread 102 comprises approximately two pitches of any thread form known in the art. Bushing 101 also comprises bore or hole 103 that runs the length of bushing 101 along a major axis. Bolt 200 engages bushing 101 through hole 103. Bolt 200, see FIG. 4, engages threads 102. An internal minor diameter of threads 102 is less than an internal diameter of hole 103 such that threads 102 may engage a bolt without bolt 200 engaging a surface of hole 103.

Bushing 101 comprises a metallic material on the preferred embodiment. However, one can appreciate that it may also comprise a non-metallic material, for example a composite, ceramic or plastic, for use in situations where a non-conductive insulator is required between joined parts, or in the case where a low-torque application is required.

Bushing 101 also comprises an external surface having external threads 104. Threads 104 extend along a length L of an outer surface of bushing 101.

Bushing 101 further comprises symmetric flats 105 that are parallel to a major axis allowing use of a wrench or fingers to install the tool, see FIG. 2 and FIG. 3. The flats are of a shape similar to that of a nut or bolt head, known in the art. The flats may also be replaced with a knurled surface or plain cylinder surface to allow the bushing to be turned by hand, i.e., finger.

Referring to FIG. 4, the device 100, without bolt 200, is first threaded into part P. Threads 104 engage threads FT in part P. In the preferred embodiment, bushing 101 is threaded into the part P until surface 106 engages part P. One can appreciate that surface 106 need not actually touch part P, but engagement is a good indication that bushing 101 is fully inserted into part P. It is also preferable that bushing 101 partially extend length A beyond part P when it is fully inserted, assuring engagement of a maximum number of threads 104 with part P. Bolt 200 is then threaded into hole 103 until a bolt shank or an end of bolt threads 202 engage threads 102. A diameter D1 of the shank is greater than a diameter D2 of threads 202, see FIG. 7. This results in an interference fit between bolt 200 and threads 102, temporarily preventing further insertion of bolt 200 into bushing 101.

Part P is then aligned with mounting surface M such that bolt 200 lines up with hole MH.

In an alternate embodiment an adhesive, such as Loctite 2015™, is applied to bolt threads 202. The adhesive is used to temporarily adhere bolt threads 202 to threads 102. In this embodiment, bushing 101 is first inserted into part P as described above. A portion of bolt threads 202 are coated with the adhesive. Bolt 200 is threaded into the bush and thereby into threads 102. The adhesive temporarily fastens the bolt threads 202 to bush threads 102. Bolt 200 is then turned which causes bushing 101 to turn as well. Bolt 200 is turned until surface 107 engages mounting surface M, at which point bushing 101 stops turning. The adhesive then fails in shear upon further application of torque to the bolt, whereby the bolt continues to turn until it is fully engaged with a hole MH.

Referring to FIG. 5, bolt 200 is then turned, which has the effect of unscrewing bushing 101 from part P due to the interference between the bolt 200 and threads 102. Bushing 101 is turned with bolt 200 until surface 107 engages mounting surface M. A further low torque is then applied to bolt 200 sufficient to distort, strip or destroy threads 102. One skilled in the art can appreciate from this description that threads 102 are relatively "soft" and as such are sacrificial in order to provide a means of turning bushing 101 with bolt 200 until the bushing seats against a mounting surface. A similar result could also be obtained by an adhesive, a short interference length or a polymeric insert, all in the hole 103 and all of which would temporarily grip the shank of the bolt allowing bushing 101 to be turned with bolt 200.

A further embodiment may comprise a variation of thread 102 where one thread is slightly distorted so that the thread is slightly "stiff" causing a frictional engagement with the bolt threads 202.

One can also appreciate that the threads on bolt 200 which engage threads 102 partially or fully deform or strip once bushing 101 is seated on the mounting surface, because the upper portion of the bolt threads are not expected to engage the threads in mouting hole MH.

In an alternate embodiment, diameter D1 of bolt 200, see FIG. 7, may extend only a limited distance up the shank from threads 202. As before, threads 102 are stripped by the wider portion of the shank. As the bolt is threaded into the mounting surface the reduced diameter portion of the bolt shank prevents a further torqued inducing engagement between the shank and the stripped threads 102. This prevents an errant torque from being registered as the bolt is fully torqued into the mounting surface.

The application of a torque to the bolt 200 to strip the threads 102 also has the effect of placing a preload on part P. This feature of the invention has the benefit of stiffening the part and overall assembly. The magnitude of the preload can be adjusted according to the torque required to strip threads 102.

Once bushing surface 107 engages mounting surface M, a torque is applied to the bolt, causing sacrificial threads 102 to fail. Bolt 200 is then fully threaded into threaded hole MH in mounting surface M until bolt flange 201 engages a bearing surface of part P. Bolt 200 may then be torqued to an appropriate torque value depending upon the application. As one can see, the tolerance gap has been automatically and completely spanned with the bushing.

FIG. 6 is a plan view of the fastener along line 6—6 in FIG. 5. Flange 201 is shown. Flange 201 may be of any width desired by a user.

As can be seen in FIG. 4 and FIG. 5, a significant tolerance T can be spanned using the inventive device while simultaneously mounting a fixture to a mounting surface. The device allows a firm, properly torqued bolted joint to be realized without putting undesirable bending (or other distorting loads) into the clamped component or fixture.

The inventive tool can be used to eliminate the effect of tolerance stacks (or, indeed, to allow the use of wide tolerances) in a number of instances, for example, in the case where a large clearance is needed to allow easy assembly of a component while fully compensating for the tolerance. The inventive device can also be used to compensate for tolerances when bolting between faces in different planes as well as bolting to faces at odd angles to a primary surface mounting surface.

Also note that the inventive device can be "inverted" in an alternate embodiment. FIG. 7 is a cross-section view of an alternate embodiment. Instead of being screwed into the part to be bolted down, it is instead screwed into the mounting surface hole using threads 104. In this case external threads 104 are left-handed. As an alternative, a frictional fitting, not shown but put in place of threads 102, is inserted into hole 103 to frictionally grip bolt 200 so that as the bolt is turned, the bushing unscrews or backs-out of the mouting surface to take up the tolerance clearance until the bushing engages the part. The frictional fitting embodiment imparts a minimal torque requirement which is easily realised as the bolt is further torqued into the mounting surface once the bushing is seated.

Once bushing 101 and part P are seated against surface 108, threads 102 are stripped as described above and bolt 200 is then completely torqued down.

In yet another alternate embodiment, threads 102 extend along the length of bore 103 and are not sacrificial. Threads 102 are the opposite hand from the threads 104. In this embodiment, bushing 101 is first threaded into mounting hole MH using left-hand threads 104. Bolt 200 is then inserted through a hole PH in part P and into bore 103. In this embodiment, part P has no threads in the hole, nor does bolt 200 threadably engage the mounting surface hole. As the bushing 101 is unscrewed from the mounting surface M by turning action of bolt 200, bushing surface 108 comes into engagement with part P.

Bolt 200 is then fully screwed into bushing 101. The left-hand thread 104 engages mouting hole MH while bolt 200 is fully torqued in place. One can appreciate that it is desireable that a minimum number of full threads engage the hole MH to develop the full strength of the connection, as known in the art of threaded connections.

One skilled in the art can also appreciate that the bushing 101 can be rotated by hand or by means of a tool or wrench using flats 105, either for installing it into a part or turning it to compensate for a tolerance clearance T.

FIG. 8 depicts a third alternate embodiment of the invention. Bushing 300 comprises a substantially cylindrical shape having a bore or hole 303 running along a major axis of bushing 300. External threads 304 extend along an outside surface of bushing 300. In this embodiment, threads 304 are right-handed. Flats or knurled surface 305 provided for manually engaging or threading the bushing comprise one end of the device. Bolt 200 engages the bushing through the hole 303. In use, component P is placed in its substantially final assembled position relative the mounting surface M. Bushing 300, with bolt 200 inserted in hole 303, is then threaded into component P using threads 315 until surface 307 engages mounting surface M. Bushing 300 may be turned manually, or, by sacrificial threads 315, or other frictional insert to engage bolt 200 thereby allowing bolt 200 to turn bushing 300 as described for the other embodiments. Once bushing surface 307 engages mounting surface M, threads 310 are stripped by further turning of bolt 200 and bolt 200 is then fully threaded into mounting surface M. Bolt 200 is fully torqued once a head of bolt 200 is fully engaged with bushing surface 308.

Figure 9:
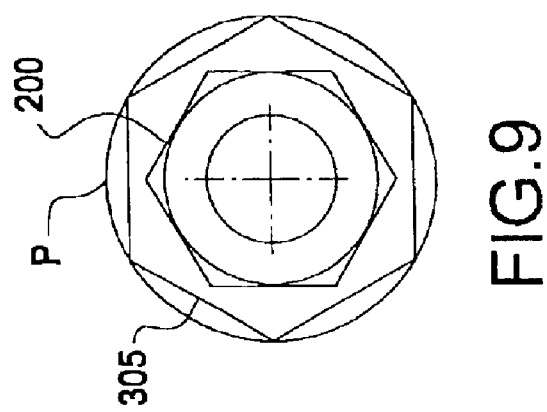
FIG. 9 is a plan view along line 9—9 in FIG. 8.

FIG. 9 is a plan view along line 9—9 in FIG. 8. Flats 305 for engaging a tool or the like are shown.

Figure 10:
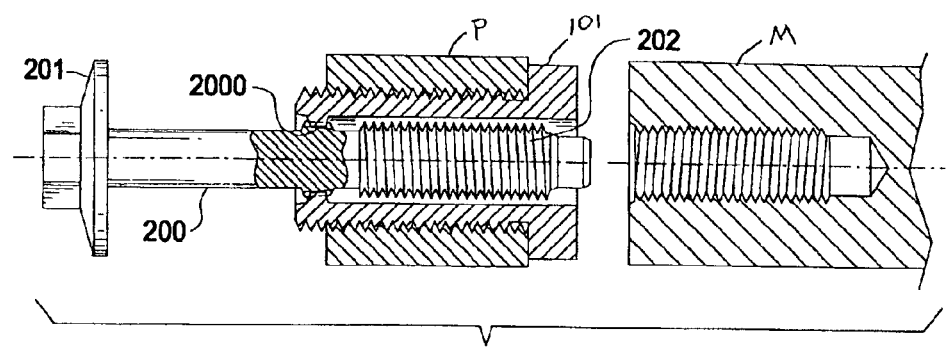
FIG. 10 is a side cross-section view of an alternate embodiment.

FIG. 10 is a side cross-section view of an alternate embodiment. Bushing 101 and bolt 200 are as described in the foregoing figures with the exception of the following. Bolt 200 comprises one or more radially projecting splines 2000. Splines 2000 have an outer diameter that is greater than an outer diameter of threads 202.

Figure 11:
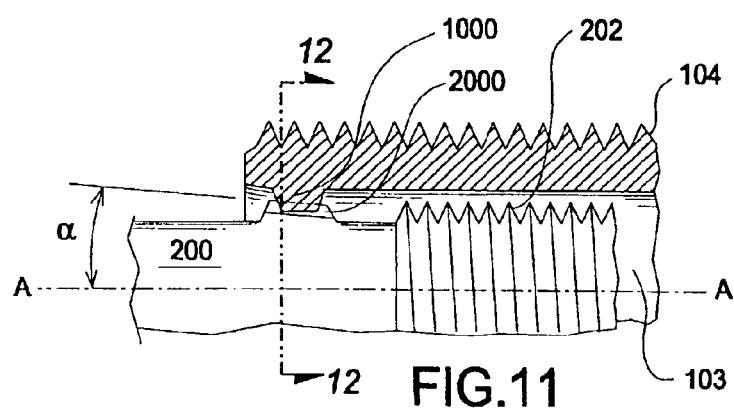
FIG. 11 is a detail of FIG. 10.

FIG. 11 is a detail of FIG. 10. Bushing 101 comprises shoulder 1000 which is disposed on an inner surface of hole 103. Shoulder 1000 has an inner diameter which is less than an outer diameter of splines 2000.

In use, once bushing 101 is inserted in to part P, bolt 200 is pressed into hole 103 until splines 2000 come into contact with shoulder 1000. Bolt 200 is further pressed axially into hole 103 with sufficient force to cause splines 2000 to partially cut into shoulder 1000. Once splines 2000 are engaged with shoulder 1000 in this manner, bushing 101 is turned by turning bolt 200. Bushing 101 stops turning when surface 107 engages M. As further torque is applied to bolt 200, splines 2000 shear off thereby allowing bolt 200 to be fully threaded into M, and thereby fully engage P as shown in FIG. 5.

Splines 2000 have a somewhat conical form, being disposed at an angle α to a bolt centerline A—A. Angle α allows splines 2000 to progressively engage shoulder 1000 up to a predetermined point without allowing splines 2000 to be driven completely past shoulder 1000 upon the initial engagement described in FIG. 10.

An outer diameter of threads 202 is less than an inner diameter of shoulder 1000 in order to prevent threads 202 from coming in contact with shoulder 1000 during insertion of bolt 200. This also provides enhanced X-Y movement flexibility of blot 200 to thereby enhance an alignment characteristic with hole MH.

Figure 12:
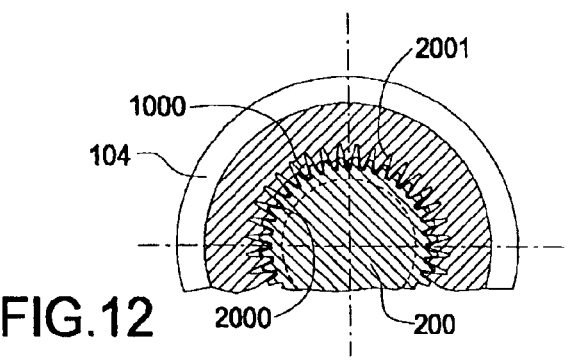
FIG. 12 is a section view at line 12—12 in FIG. 11.

FIG. 12 is a section view at line 12—12 in FIG. 11. Splines 2000 are shown radially projecting from bolt 200, toward and engaged with shoulder 1000. In an alternate embodiment, slots to receive splines 2000 may be precut into shoulder 1000.

Figures 13, 14:
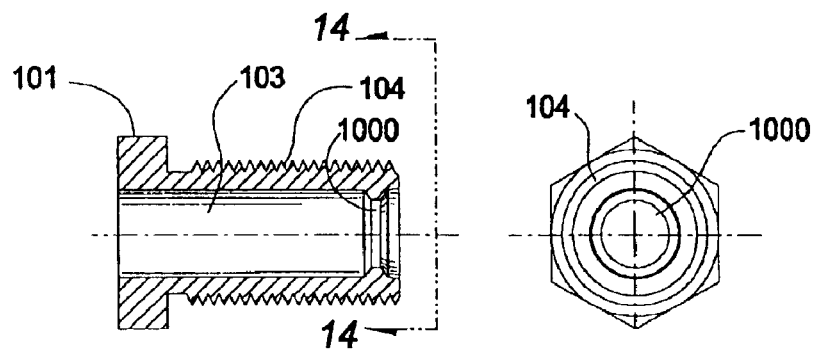
FIG. 13 is a side cross-section view of the alternate embodiment shown in FIG. 10.
FIG. 14 is a plan view at line 14—14 in FIG. 13.

FIG. 13 is a side cross-section view of the alternate embodiment shown in FIG. 10. Shoulder 1000 is shown extending from an inner surface of bore 103. Shoulder 1000 may extend over only a portion of the inner surface with equally good results. The engagement between shoulder 1000 and spline or splines 2000 need only be sufficient for bolt 200 to transmit torque to bushing 101 sufficient to overcome a turning friction of bushing 101 in part P.

FIG. 14 is a plan view at line 14—14 in FIG. 13.

Figure 15:
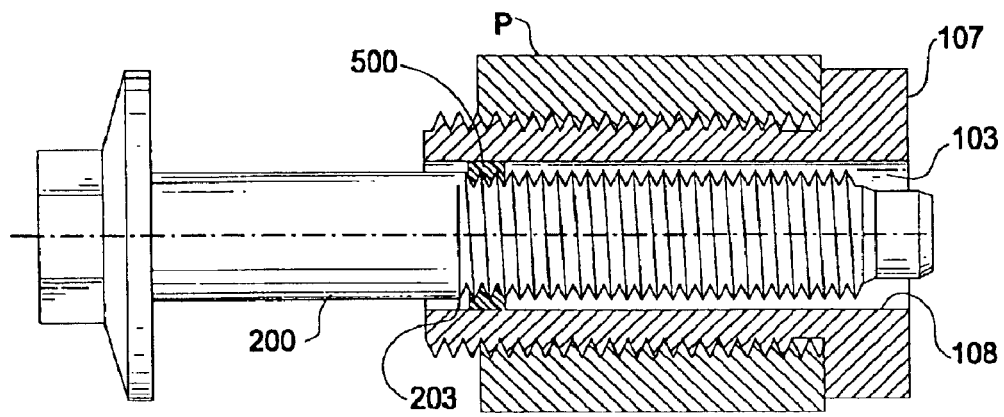
FIG. 15 is a cross-sectional view of an alternate embodiment.

FIG. 15 is a cross-sectional view of an alternate embodiment. Collar 500 is engaged with and between bolt threads 202 and bushing bore inner surface 108. Collar 500 comprises outer surface 501 and threads 502. Threads 502 may be precut or may be cut by action of threads 202. Collar 500 has a torous form.

In use, collar 500 is turned or threaded onto threads 202, which may include contact with shank edge 203. Contact with shank edge 203 limits any further travel of collar 500 up the bolt. Bolt 200 with collar 500 is then inserted into bore 103. An outside diameter of collar 500 is equal to or slightly greater than an inside diameter of bore 103 in order to create a frictional engagement between outer surface 501 of collar 500 and the inside surface 108 of bushing 101. As bolt 200 is turned into hole MH the frictional engagement of collar outer surface 501 with the inner surface 108 of bushing 101 causes bushing 101 to turn. As bushing 101 turns, bushing 101 moves axially resulting in surface 107 coming into contact with mounting surface M. Bushing 100 then stops turning as bolt 200 is then fully threaded into mounting hole MH. Once bushing 101 engages mounting surface M, collar 500 simply slides along inner surface 108. The sense or direction of threads 104 is the same as for threads 202. Threads 104 and 202 may either be right-handed or left-handed.

Collar 500 may comprise any material which can be cut by threads 202 and have a sufficient coefficient of friction on outer surface 501 to cause bushing 101 to turn upon a rotation of bolt 200. Collar 500 may comprise a plastic material, such as nylon, or any equivalent thereof.

Collar 500 may also comprise an inside diameter sufficiently small so as to create a frictional fit between collar 500 and bolt threads 202. A frictional fit is also present between outer surface 501 and inner surface 108 as described above. Such a frictional fit between the collar and the bolt threads does not require collar 500 to engage a shank edge 203 in order to cause bushing 101 to turn upon a rotation of bolt 200.

Figure 16:
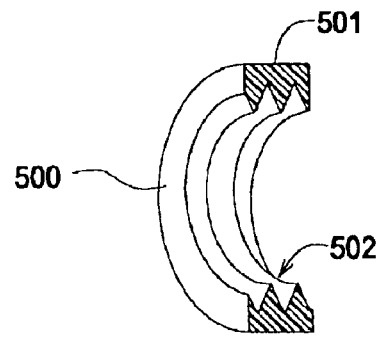
FIG. 16 is a perspective cross-sectional view of a collar used in the alternate embodiment in FIG. 15.

FIG. 16 is a perspective cross-sectional view of a collar used in the alternate embodiment in FIG. 15. Collar 500 is shown having threads 502 cut therein after engaging bolt threads 202. As previously described, threads 502 may be precut as well. Outer surface 501 frictionally engages an inner surface 108 of bushing 101.

Although a form of the invention has been described herein, it will be obvious to those skilled in the art that variations may be made in the construction and relation of parts without departing from the spirit and scope of the invention described herein.

What is claimed is:

1. A device comprising:
   a substantially cylindrical body having a thread on an external surface and describing an internal bore for receiving a fastener, the bore parallel to a major axis;
   the internal bore having a surface feature engagable with the fastener, the surface feature comprising a sacrificial thread which deforms upon engagement with a non-threaded fastener portion;
   a first surface extending substantially perpendicularly to a major axis at one end of the cylindrical body; and
   the body further comprises symmetrically arranged engagement surfaces parallel to a major axis for turning the body.

2. The device as in claim 1, wherein:
   the threaded fastener is engageable with a mounting surface hole.

3. The device as in claim 2, wherein the threaded fastener further comprises a second surface extending perpendicular to a fastener major axis.

4. The device as in claim 1, wherein:
   the internal bore surface further comprises a feature having threads for engaging a fastener.

5. The device as in claim 4, wherein:
   the external thread is opposite hand from the thread on the internal bore surface.

6. The device as in claim 5, wherein:
   the external thread comprise left-hand threads.

7. The device as in claim 1, wherein the body comprises a metallic material.

8. The device as in claim 1, wherein the body comprises a non-metallic material.

9. The device as in claim 1, wherein the internal bore surface further comprises a frictional surface for slidingly engaging a fastener.

10. A mounting bushing comprising:
    a fastener;
    a substantially cylindrical body having a thread on an external surface for engaging a part and describing an internal bore for receiving the fastener, the bore parallel to a major axis, the body further comprises symmetrically arranged engagement surfaces parallel to a major axis for turning the body;
    a first surface extending substantially perpendicularly to a major axis at one end of the cylindrical body for engaging a mounting surface;
    the internal bore having a surface feature on a portion of the internal bore, the surface feature comprising a sacrificial thread having a diameter less than an internal bore diameter for engaging a fastener, the fastener further engageable with a mounting surface hole;
    wherein the fastener further comprises a second surface extending perpendicularly to a fastener major axis for engaging a part.

11. The bushing as in claim 10, wherein a portion of the fastener is threaded.

12. A mounting bushing comprising:
    a substantially cylindrical body having a thread on an external surface for engaging a part and describing an internal bore for receiving a fastener, the body further comprises symmetrically arranged engagement surfaces parallel to a major axis for turning the body;
    a first surface extending substantially perpendicularly to a major axis at one end of the cylindrical body for engaging a mounting surface;
    the internal bore having a surface feature comprising a sacrificial thread that deforms upon engaging a non-threaded fastener portion.

13. A tolerance compensating device comprising:
    a bushing having a helical thread on an external surface for engaging a cooperating helical thread on a structural part and further describing a bore for receiving a fastener, rotation of the bushing in the structural part determining an axial position of the bushing;
    a bushing surface for engaging another structural part;
    a fastener having a non-threaded fastener shank; and
    a member engaged with the fastener shank and with a bore surface, rotation of the fastener causing a rotation of the member and thereby of the bushing into a bearing position on the other structural part.

14. The device as in claim 13, wherein the member describes a toroidal form.

15. The device as in claim 13, wherein the member describes a bore, the bore having a thread for cooperatively engaging the fastener.

16. A device comprising:
    a substantially cylindrical body having a thread on an external surface and describing an internal bore for receiving a fastener;
    a first surface extending substantially perpendicularly to a major axis at one end of the cylindrical body; and
    the internal bore having a sacrificial thread for engaging a fastener.

17. The device as in claim 16, wherein:
    the thread on the external surface opposite hand from the sacrificial thread.

\* \* \* \* \*